United States Patent
Krietemeyer et al.

(10) Patent No.: US 7,228,461 B2
(45) Date of Patent: Jun. 5, 2007

(54) SYSTEM, METHOD, AND USER INTERFACE FOR ACCEPTANCE TESTING

(75) Inventors: James R. Krietemeyer, Cincinnati, OH (US); Stephen Scott Strickland, Terrace Park, OH (US); David M. Farmer, Loveland, OH (US); Martin Gehringer, Aisch (DE)

(73) Assignee: Siemens Energy & Automation, Inc., Alpharetta, GA (US)

( * ) Notice: Subject to any disclaimer, the term of this patent is extended or adjusted under 35 U.S.C. 154(b) by 497 days.

(21) Appl. No.: 10/717,823

(22) Filed: Nov. 20, 2003

(65) Prior Publication Data

US 2004/0153788 A1 Aug. 5, 2004

Related U.S. Application Data

(60) Provisional application No. 60/439,005, filed on Jan. 9, 2003.

(51) Int. Cl.
*G06F 11/00* (2006.01)

(52) U.S. Cl. .......................................... 714/45; 714/57

(58) Field of Classification Search ................ 700/21, 700/79–82; 714/45, 57
See application file for complete search history.

(56) References Cited

U.S. PATENT DOCUMENTS

| | | | | |
|---|---|---|---|---|
| 4,999,837 A * | 3/1991 | Reynolds et al. | ............ | 714/703 |
| 5,214,582 A | 5/1993 | Gray | .................... | 364/424.03 |
| 5,247,664 A * | 9/1993 | Thompson et al. | ............ | 707/10 |
| 5,415,053 A * | 5/1995 | Elias | ......................... | 73/865.7 |
| 5,492,022 A * | 2/1996 | Elias | ......................... | 73/865.7 |
| 5,532,927 A * | 7/1996 | Pink et al. | .................... | 701/34 |
| 5,539,652 A * | 7/1996 | Tegethoff | .................... | 703/14 |
| 5,566,092 A * | 10/1996 | Wang et al. | ................. | 702/185 |
| 5,600,789 A * | 2/1997 | Parker et al. | ................. | 714/38 |
| 5,602,761 A * | 2/1997 | Spoerre et al. | ............. | 702/179 |
| 5,715,178 A * | 2/1998 | Scarola et al. | .............. | 702/116 |
| 5,729,452 A * | 3/1998 | Smith et al. | .................. | 701/29 |
| 5,798,647 A | 8/1998 | Martin et al. | ............... | 324/503 |
| 5,984,503 A * | 11/1999 | Strickland et al. | ............ | 700/95 |
| 6,035,293 A * | 3/2000 | Lantz et al. | ................... | 707/1 |
| 6,041,287 A * | 3/2000 | Dister et al. | ................ | 702/182 |
| 6,077,051 A * | 6/2000 | Centers et al. | ............. | 417/280 |
| 6,146,523 A * | 11/2000 | Kenley et al. | ............. | 210/143 |
| 6,243,835 B1 * | 6/2001 | Enokido et al. | .............. | 714/38 |
| 6,246,787 B1 * | 6/2001 | Hennessey et al. | ......... | 382/141 |
| 6,338,152 B1 * | 1/2002 | Fera et al. | .................... | 714/48 |
| 6,397,111 B1 * | 5/2002 | Niwa | .......................... | 700/11 |
| 6,539,313 B1 * | 3/2003 | Bornemann et al. | ......... | 702/33 |

(Continued)

FOREIGN PATENT DOCUMENTS

EP 0716311 A2 6/1996

OTHER PUBLICATIONS

STSARCES, "Final Report: Safety-Related Complex Electronic Systems", Feb. 29, 2000, pp. 1-137.*

(Continued)

*Primary Examiner*—Bryce P. Bonzo

(57) ABSTRACT

Certain exemplary embodiments provide a method comprising automatically enforcing user compliance with a plurality of predetermined steps of a computer-assisted verification test of a safety feature for a machine system; inducing an error condition in the machine system; and collecting data regarding a response of the machine system to the error condition.

42 Claims, 10 Drawing Sheets

U.S. PATENT DOCUMENTS

| | | | |
|---|---|---|---|
| 6,973,396 B1* | 12/2005 | Shah et al. | 702/81 |
| 7,047,442 B2* | 5/2006 | Sutton | 714/25 |
| 2002/0077778 A1* | 6/2002 | Cobble et al. | 702/183 |
| 2002/0166082 A1* | 11/2002 | Ramadei et al. | 714/37 |
| 2002/0170000 A1* | 11/2002 | Gorodetsky et al. | 714/30 |
| 2003/0208712 A1* | 11/2003 | Louden et al. | 714/742 |
| 2004/0064253 A1* | 4/2004 | Brayton et al. | 702/2 |
| 2004/0250191 A1* | 12/2004 | Leaming | 714/742 |
| 2005/0262457 A1* | 11/2005 | Granier et al. | 716/4 |
| 2005/0268170 A1* | 12/2005 | Kearney et al. | 714/32 |

OTHER PUBLICATIONS

PCT International Search Report, PCT/US 03/40037, mailed Nov. 24, 2004.

Patent Cooperation Treaty, PCT/US 03/40037, mailed Nov. 24, 2004.

* cited by examiner

4200

```
List of Tests
  📄 Overview
  📋 Pulse Disable Path
        ✓ Test 1
  📋 External Stops
        ✓ Operator Door
        ✗ Tool Chain Door
        📄 Test 3
  📋 SPL Inputs/Outputs
  📋 Wiring Cross Check
  📋 Emergency Stop
  📋 Functional Relationships
  📋 (SBH) Safe Oper. Stop
  📋 (SG) Safe Speed
  📋 (SE) Safe Software Limit
  👆 Finished
```

4210 — Test 1
4220 — Operator Door
4230 — Tool Chain Door
4290 — Finished

| Siemens Safety Integrated Acceptance Test | | _ |□| x| |
|---|---|---|
| List of Tests | Test of Wiring Cross Check<br>The test is complete. Please provide a description of the test and indicate success or failure. | Results:<br>Test 1 |
| ◯ Overview<br>🗎 Pulse Disable Path<br>🗎 External Stops<br>🗎 SPL Inputs/Outputs<br>🗎 Wiring Cross Check<br>   ✓ Disconnected Input<br>🗎 Emergency Stop<br>🗎 Functional Relationships<br>🗎 (SBH) Safe Oper. Stop<br>🗎 (SG) Safe Speed<br>🗎 (SE) Safe Software Limit<br>🗎 Finished | Test Trigger Condition: \| Verify Alarms List<br>Disconnected Input I32.7 \| Alarm 5011<br>\| Alarm 5028<br>\| Alarm 5034<br>\| Alarm 5022<br><br>⦿ Click here if the expected reaction occurred and the expected alarms appear.<br>○ Click here if the expected reaction did NOT occur or the expected alarms did NOT appear.<br><br>8350 | Repeat This Test<br><br>Delete Test Results |
| < Previous Page   Next Page -> | | Exit   Help |

Siemens Safety Integrated Acceptance Test

List of Tests
- Overview
- Pulse Disable Path
- External Stops
- SPL Inputs/Outputs
- Wiring Cross Check
- Emergency Stop
- Functional Relationships
- (SBH) Safe Oper. Stop
  - ✓ Axis X1 +
- (SG) Safe Speed
- (SE) Safe Software Limit
- Finished

Test of SBH (Safe Operational Stop) Reaction
The test is complete. Please provide a description of the test and indicate success or failure.

| Description | Data |
|---|---|
| Axis/Spindle Name | Axis X1 |
| Direction | Pos |
| Speed exceeded | 71 mm/min |
| Reaction Time | 0.5334 s |
| Overtravel | 5.795 mm |

| Test Trigger Condition: | Test Alarms |
|---|---|
| Movement with adjusted traversing profile while SBH was active | Alarm 27011<br>Alarm 27022<br>Alarm 300908<br>Alarm 300914 |

○ Click here if operational stop error was properly handled.
○ Click here if operational stop error was NOT properly handled.

Results:
Axis X1 +

Repeat This Test for Another Axis

Delete Test Results

View Results Graphs

< Previous Page | Next Page -> | Exit | Help

Fig. 9

SYSTEM, METHOD, AND USER INTERFACE FOR ACCEPTANCE TESTING

CROSS-REFERENCE TO RELATED APPLICATIONS

This application claims priority to pending provisional application Ser. No. 60/439,005, filed 9 Jan. 2003.

SUMMARY

Certain exemplary embodiments provide a method comprising automatically enforcing user compliance with a plurality of predetermined steps of a computer-assisted verification test of a safety feature for a machine system; inducing an error condition in the machine system; and collecting data regarding a response of the machine system to the error condition.

BRIEF DESCRIPTION OF THE DRAWINGS

A wide array of potential embodiments can be better understood through the following detailed description and the accompanying drawings in which:

FIG. 5 is a diagram of exemplary embodiment of a user interface element 4200;

FIG. 8 is a diagram of exemplary embodiment of a user interface 8000;

FIG. 9 is a diagram of exemplary embodiment of a user interface 9000.

DEFINITIONS

Figure 1:
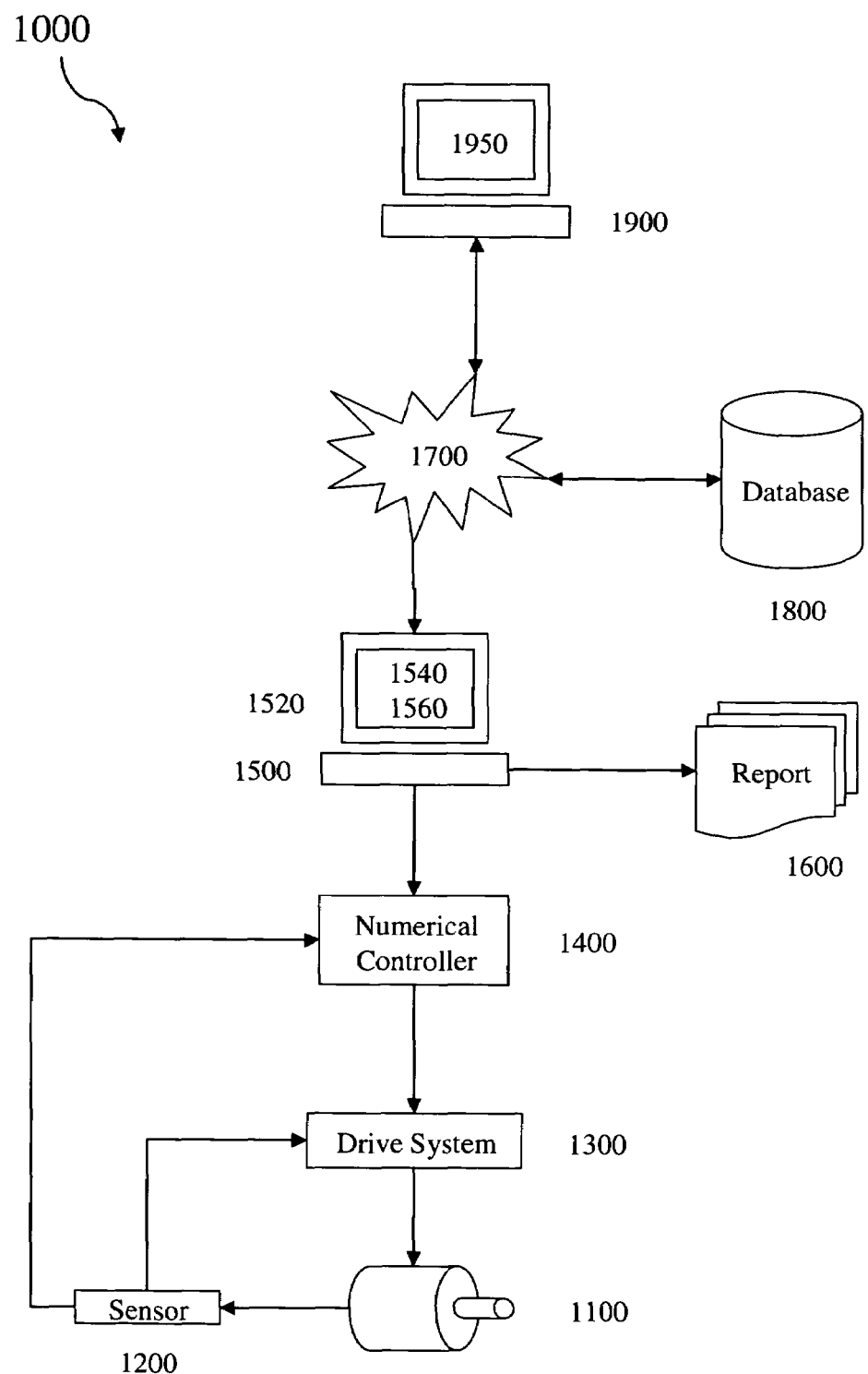
FIG. 1 is a block diagram of an exemplary embodiment of a system 1000.

When the following terms are used herein, the accompanying definitions apply:

automatically—acting or operating in a manner essentially independent of external influence or control. For example, an automatic light switch can turn on upon "seeing" a person in its view, without the person manually operating the light switch.

enforcing—requiring compliance and/or preventing non-compliance with a predetermined action and/or rule.

verification test—a test designed to determine whether the tested item has a predetermined capability and/or whether the tested item complies with a predetermined requirement.

safety feature—a measure provided to prevent and/or reduce damage. A safety feature for example, can be intended to protect personnel, property, and/or information, etc. In a machine system, a safety feature can be designed to protect personnel; one or more components of the machine system; items to be processed by, being processed by, and/or already processed by, the machine system; an environment surrounding and/or near the machine system; a process and/or components of a process with which the machine system is associated; etc.

machine system—a machine and any drives or controls for operating that machine. For example, a machine system can include a machine tool, a motor, and/or a numerical controller, etc.

inducing—causing to occur or to be perceived as occurring.

error condition—a predetermined potentially unsafe value for, or predetermined potentially unsafe state of, a safety feature.

initial condition—a predetermined and preliminary state and/or value.

wizard—a software program designed to guide a user through predetermined steps of a task.

processor—any device and/or set of machine-readable instructions for performing a specific task. A processor comprises any one or combination of hardware, firmware, and/or software. A processor acts upon information by manipulating, analyzing, modifying, converting, transmitting the information to an information device, and/or routing the information to an output device.

trace—a plot of amplitude versus time. For example, a plot of voltage versus time, typically with time extending along a horizontal axis, and voltage along a vertical axis. Other variables can be "traced" or plotted against time, including current, power, resistance, inductance, displacement, position, etc.

DETAILED DESCRIPTION

Certain exemplary embodiments provide a safety acceptance testing wizard that can be used, for example, with safety acceptance testing of a machine system, such as a numeric controller and/or a machine tool.

Certain numeric controllers have numerous programmable features, including safety features that can protect operating personnel, machinery, and/or items undergoing machining. For example, a programmable numeric controller safety feature can shut down an attached machine tool when certain error conditions occur, such as the opening of a guard intended to keep fingers or the like away from the running machine tool. The programmability of certain of such safety features at the numeric controller can be utilized to avoid the addition of external sensors, wiring, etc. by the machine tool manufacturer. Testing these safety features to verify they function properly can be performed during design, upon assembly, and/or periodically after installation, of the numeric controller and/or machine tool.

Certain exemplary embodiments of a software tool ("wizard") can facilitate such safety acceptance testing by automatically:

providing instructions for the test;

enforcing certain predetermined steps of the test;

setting-up the initial conditions for the test, such as resetting any error conditions, resetting any data collectors, and/or preparing the numeric controller to enter into a test mode to allow creation of an error condition;

inducing the error condition;

collecting data regarding the steps performed, the error conditions generated, and the response of the numeric controller to the error condition. The data can include graphical, time-based, status, and/or alarm data, etc., such as screen shots, traces, tabular data, etc.;

analyzing the collected data;

verifying and/or facilitating human verification that the test succeeded; and/or generating a report of the test, including the tests performed, the steps followed, the initial conditions, the error condition induced, the data collected, and/or the analysis of that data. The report can be generated by merging the test information with a standardized template.

The software wizard can provide at least one graphical user interface that:

is intuitive and/or easy to use;
integrates test instructions;
provides help for implementing test instructions;
minimizes test instructions;
minimizes unnecessary user input;
formats and displays collected data in a manner than minimizes the work of the user;
provides a current status of all tests without requiring report generation;
allows easy and quick navigation to individual tests; and/or
allows easy repetition of individual tests.

FIG. 1 is a block diagram of an exemplary embodiment of a system 1000, which can comprise a machine tool 1100 that is driven by a motor, hydraulic system, pneumatic system, etc. A variable of machine tool 1100, such as a voltage, current, resistance, capacitance, inductance, power, movement, displacement, gap, proximity, position, and/or vibration, etc., can be detected by a transducer and/or sensor 1200, and provided to a drive control 1300 and/or a numerical controller 1400, which can provide control signals and/or power to machine tool 1100. A machine system can comprise machine tool 1100, sensor 1200, drive control 1300, and/or numerical controller 1400.

A user can perform a verification test of the machine system and/or any component thereof via an information device 1500 comprising one or more processors 1520, a user interface 1540, and/or a software wizard 1560. The verification test can result in one or more reports 1600. Data related to the verification test can be stored in a database 1800, which can be coupled to information device 1500 via a network 1700. One or more additional information devices 1900, each having a user interface 1950, can be coupled to network 1700, such as for remotely operating one or more of processors 1520, user interface 1540, and/or software wizard 1560.

Figure 2:
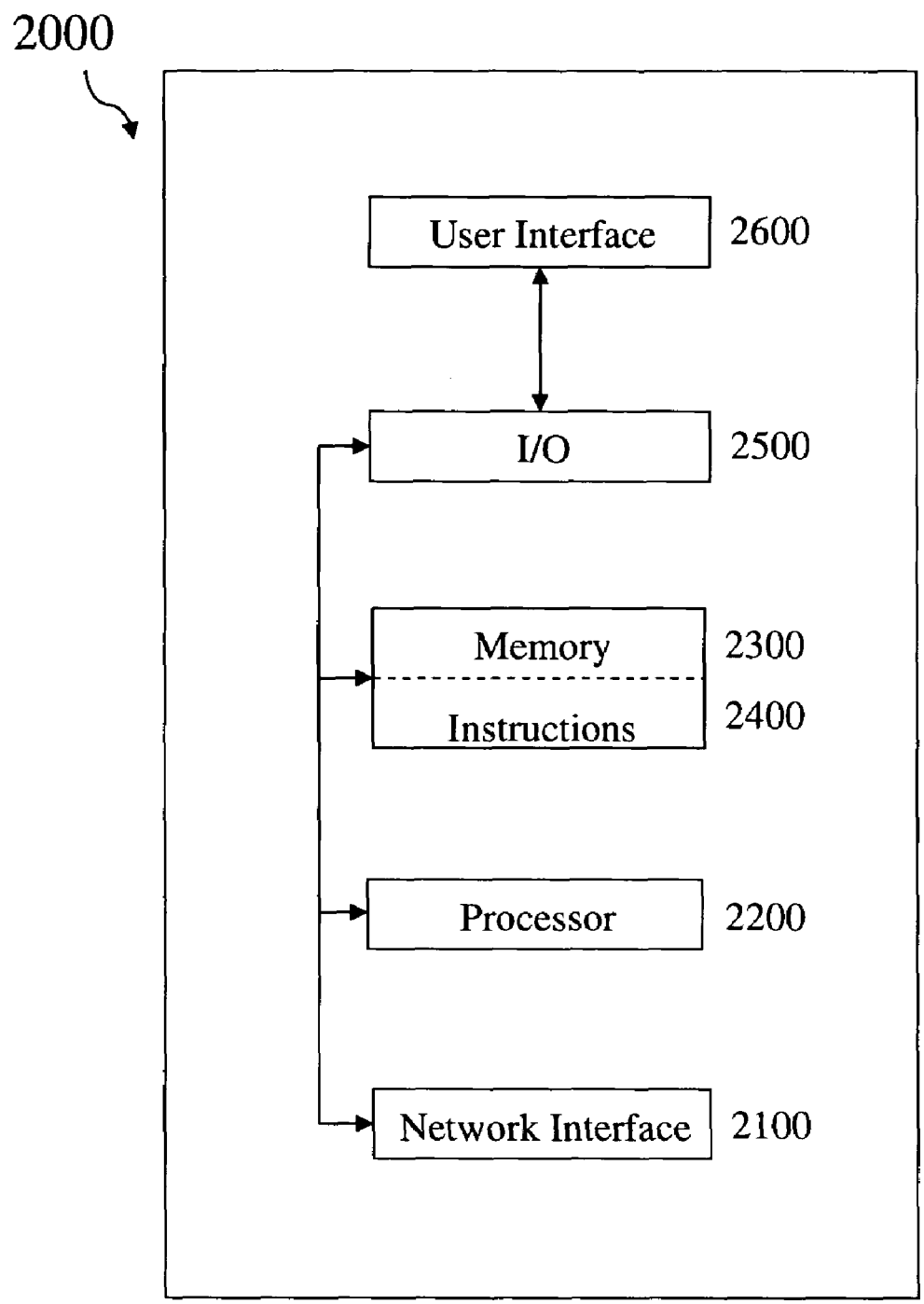
FIG. 2 is a block diagram of an exemplary embodiment of an information device 2000.

FIG. 2 is a block diagram of an exemplary embodiment of an information device 2000, which can represent any of information devices 1500 and/or 1900 of FIG. 1. Information device 2000 can comprise any of numerous well-known components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "network interface" means any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage, such as for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term "haptic" means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the term "user interface" means any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc.

A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

In certain exemplary embodiments, via one or more user interfaces 2600, a user can interact with a software wizard to select one or more verification tests, select an order in which to perform the selected tests, configure the tests. Via one or more user interfaces, the software wizard can set initial conditions for a test, provide the user with instructions regarding the test, enforce user compliance with certain predetermined steps of the test, monitor the test, collect data regarding the test, render collected data, analyze the collected data, and/or provide a report regarding the test.

Figure 3:
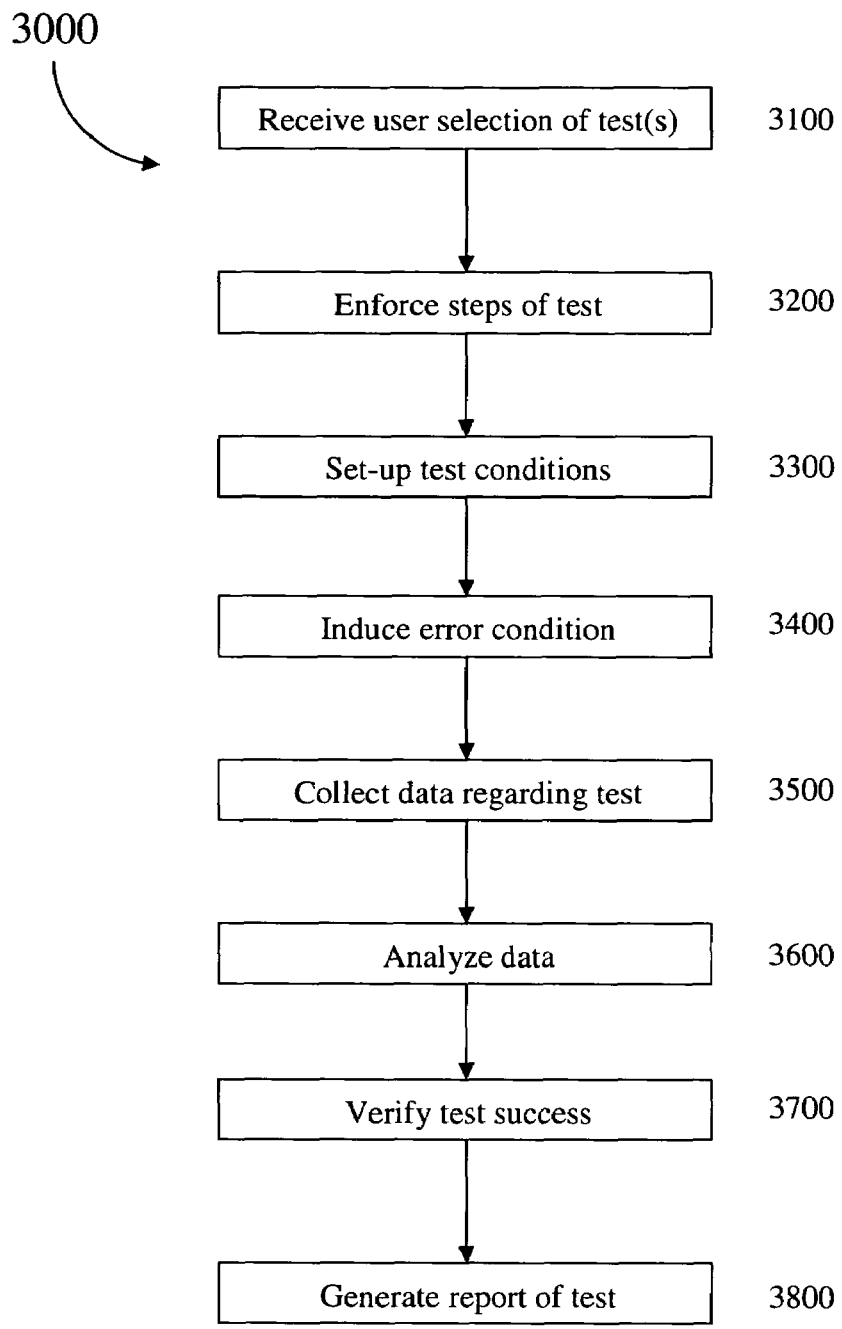
FIG. 3 is a flow chart of an exemplary embodiment of a method 3000.

FIG. 3 is a flow chart of an exemplary embodiment of a method 3000. At activity 3100, the user interface and/or wizard can receive one or more user selections related to one or more verification tests. For example, a user can indicate and/or select the development stage of a machine system, such as design, fabrication, installation, operation, maintenance, repair, and/or modification, etc. Given the development stage, the wizard can limit the potential tests to those that are appropriate for the indicated development stage. As another example, a user can indicate and/or select specific components of a machine system to test. Again, the wizard can limit the potential tests to those that are appropriate for the indicated components of the machine system. As yet another example, the user can indicate and/or select specific desired verification tests. Moreover, one the verification tests are indicated by the wizard and/or selected by the user, the wizard can allow the user to indicate a preferred sequential order of the tests. The wizard can limit the sequence of the tests to an order that is appropriate and/or falls within one of a plurality of predetermined orders.

At activity 3200, the wizard can enforce certain predetermined steps of the test, including enforcing user compliance therewith. For example, the wizard can require that the user select an order for the tests before configuring any of the tests, or vice versa. As another example, the wizard can require that a user set an initial condition, such as opening an access door of the machine system, locking a lock, specifying and/or providing a file name for test data, etc. As yet another example, the wizard can request, and the user can provide, input regarding initial values of variables, an axis the user wishes to test, alarms the user wishes to appear in a test report, confirmation that the user has performed certain requested actions, etc.

At activity 3300, the wizard and/or user can set-up the test conditions. For example, the wizard can reset and/or reinitialize variables, error conditions, data collectors, an IPO (interpolation) trace (a graphical time-based data collector), logs, error logs, and/or tables, etc. As another example, the wizard can remove any of the machine system's set speed limits, and/or position limits. As still another example, the wizard and/or user can prepare a numeric controller to enter into a test mode to allow creation of an error condition.

At activity 3400, the wizard and/or user can induce an error condition. For example, the wizard can signal a numeric controller that, for example, a protective door is open; a light barrier has been penetrated; a workpiece is out of position; an emergency STOP button has been pressed; an axis is stationary; an axis is moving; an interconnect is broken; a relay has opened; a relay has closed; protective gear is not in place; and/or a temperature, pressure, flowrate, or other process variable is out of bounds; etc. As another example, the wizard can signal that something has not occurred in a required time period and/or sequence.

At activity 3500, the wizard can collect data regarding the steps performed, the error conditions generated, and the response of the numeric controller to the error condition. The data can include graphical, time-based, status, and/or alarm data, etc., such as screen shots, traces, tabular data, etc. The wizard can monitor the test, including for example, the steps performed, error conditions generated, and the response of the numeric controller to the error condition, and can provide a notification if a problem is detected. If a problem is detected and corrected, the wizard can update a status of the verification test to indicate that fact.

At activity 3600, the wizard can process the collected data. For example, the wizard can analyze the collected data, render (i.e., make perceptible) the collected data, and/or highlight data that appear to be out of bounds, missing, and/or erroneous. As another example, the wizard can analyze the data in real time during collection, monitoring for data that appear to be out of bounds, missing, and/or erroneous. In addition, the wizard can render the data in a manner understandable to the user, such as in a trace, a process control chart, a three dimensional chart, a table, etc.

At activity 3700, the wizard can verify and/or facilitate human verification that the test succeeded. For example, the wizard can compare the initial conditions, activities performed, error conditions induced, and/or collected data to verify that the test was performed properly. As another example, the wizard can compare the collected data against predefined limits to verify that the data are within bounds and that the test succeeded. As still another example, the wizard can present the data and the predefined limits so that a user can indicate (e.g., via a checkbox, radio button, button, menu selection, or the like) that the test succeeded.

At activity 3800, the wizard can generate a report of the test, including the tests performed, the steps followed, a description of the steps followed, the initial conditions, the error conditions induced, the data collected, and/or the analysis of that data. The report can be generated by merging the test information with a standardized template. The wizard can seek user input at any time for certain aspects of the report, such as its title, what tests are included, what data is included, formatting of the report, a filename for the report, where the report is to be saved, whether to print the report, etc.

Figure 4:
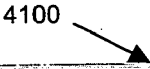
FIG. 4 is a diagram of exemplary embodiment of a user interface 4000.

FIG. 4 is a diagram of exemplary embodiment of a user interface 4000, which comprises a plurality of user interface elements, such as for example, a window 4100, buttons, selectable lists, etc. Window 4100 can contain a list view on the left referred to as the Selection/Status Pane 4200, via which a user can select a test and/or the wizard can indicate a test. Pane 4200 can display status information pertaining to individual tests and/or the overall acceptance test. Pane 4200 can allow navigation between test steps and/or between test results Within pane 4200, tests can be displayed in one of three states:

🔘 enabled tests are appropriate for the machine type and must be run.

⚪ disabled tests are inappropriate for the machine type and feature content and cannot be run.

🔘 deselected tests are test that have been specified as not applicable for the current machine configuration by the user. Tests are deselected by navigating to the individual test and then deselecting the test by checking a checkbox on the test summary screen.

As tests are performed the list can be modified to contain entries that show the status of individual tests (or steps). FIG. 5 shows an exemplary embodiment of a Selection/Status Pane 4200 containing the results of three tests:

4210: a passed test "Test1" of the Pulse Disable Path step;

4220: a passed test "Operator Door" of the External Stops step; and

4230: a failed test "Tool Chain Door" of the External Stops step.

Note that test status can be displayed as indented entries that can appear beneath the corresponding test step. For tests that involve multiple test sequences and results, the individual test results can be added in the chronological order. In certain exemplary embodiments, the status of tests are indicated with icons, namely:

✓ Indicates that a test has been run and passed

✗ Indicates that a test has been run and failed

📖 Indicates that a test is in the process of being run. The test currently is incomplete.

The last entry 4290 in the list is labeled "Finished". This entry can be used primarily to indicate status. Initially the entry can be disabled (greyed) and can be enabled upon completion of at least one iteration of each of the tests. Note that test completion does not necessarily have a requirement for the test passing, but rather can indicate that the test was run to completion.

The selected entry in the Selection/Status pane 4200 can determine the test dialog that is shown in the Dialog Pane (shown in FIG. 4). Test selection or navigation can be achieved by clicking on a list entry or by scrolling through the list with keyboard input.

Returning to FIG. 4, window 4100 can also contain additional fields, buttons, and/or controls in a Dialog Pane 4300, which can be located on the right side of window 4100. Dialog Pane 4100 can display test specific dialogs 4350 that provide the user interface for instructing, commissioning, and/or running a test, capturing test results data, and/or marking the pass/fail status of the test. The dialog that appears in the Dialog Pane can be determined by the active selection in the Selection/Status pane 4200.

A test dialog 4350 can provide the user interface for a particular test in the overall Acceptance Test. Since the testing procedures can generally involve the same type of operational steps each of the test dialogs 4350 can have generally the same operational model. Test dialogs 4350 can typically consist of three screens:

An introduction screen that can provide a test summary documenting how to perform the test. This screen can contain a concise, but as detailed as possible description of the purpose of the test, the test procedure, and/or any appropriate operational warnings (safety). Typically, it is not intended that this documentation be a replacement for hard copy or online user manuals, but can instead function as a supplement to that documentation.

A screen that can be used to run the test and/or to finalize the data collection. This screen can utilize a "step by step" approach that provides prompting for each step of the test. Common test operations can include:

Establish initial conditions for the test by entering any data necessary to run the test. For instance, some tests require an axis be specified. This act may itself require multiple steps depending on the number of items that must be commissioned.

Initiation of data collection by starting the test. Data collection can be started automatically once the test is started and all required test commissioning has been completed. User interaction might be required prior to the automatic initiation of data collection. Typically, the user is not prompted to start data collection.

Termination of data collection. Wherever possible the termination of data collection can be automated, otherwise the user can stop data collection when the test is complete.

Selection of data that is to be persisted. Often only a small portion of collected data is persisted. Typically, the user can perform this selection task.

Restoration of initial conditions. Certain tests prompt the user to restore the machine system to its original state before proceeding to the next screen. This can be purely an informational step.

A screen that is used to enter user test results. In certain embodiments, the test dialog makes no determination as to the pass/fail status of a test so the user must enter this data. In other embodiments, the test dialog can make a determination as to the pass/fail status of a test. Some tests can require the user to add documentation about what is being tested. If the test procedure is one where multiple iterations of the test is appropriate, for say each commisioned axis, then this screen can contain a navigational button that allows the test to be re-run with different commissioning.

Window portion 4400 can provide a title and/or general explanation for a given test. User interface elements 4410 through 4490 can provide fields for user entry of data relevant to the test, such as fields for: a machine designation 4410; a machine type 4420; a machine serial number 4430; a machine manufacturer 4440; a PLC manufacturer 4450; an ultimate customer for the machine 4460; a name of the user/tester/operator of the test 4470; a indication 4480 of whether a verification of an initial machine can allow other related machines to utilize a reduced set of tests; and/or whether the machine uses "safe programmable logic" 4490. In certain, many, and/or all test windows, a help request button 4500 can be provided, the activation of which can launch a help utility. In certain, many, and/or all test windows, an "exit" button 4600 can be provided, the activation of which can terminate the wizard, but might require further confirmation before termination is allowed. In certain, many, and/or all test windows, navigation controls can be provided, such as a "previous page" and/or "next page" button 4700, which can allow navigation between tests, depending on the context.

Figure 6:
FIG. 6 is a diagram of exemplary embodiment of a user interface 6000.
Figure 7:
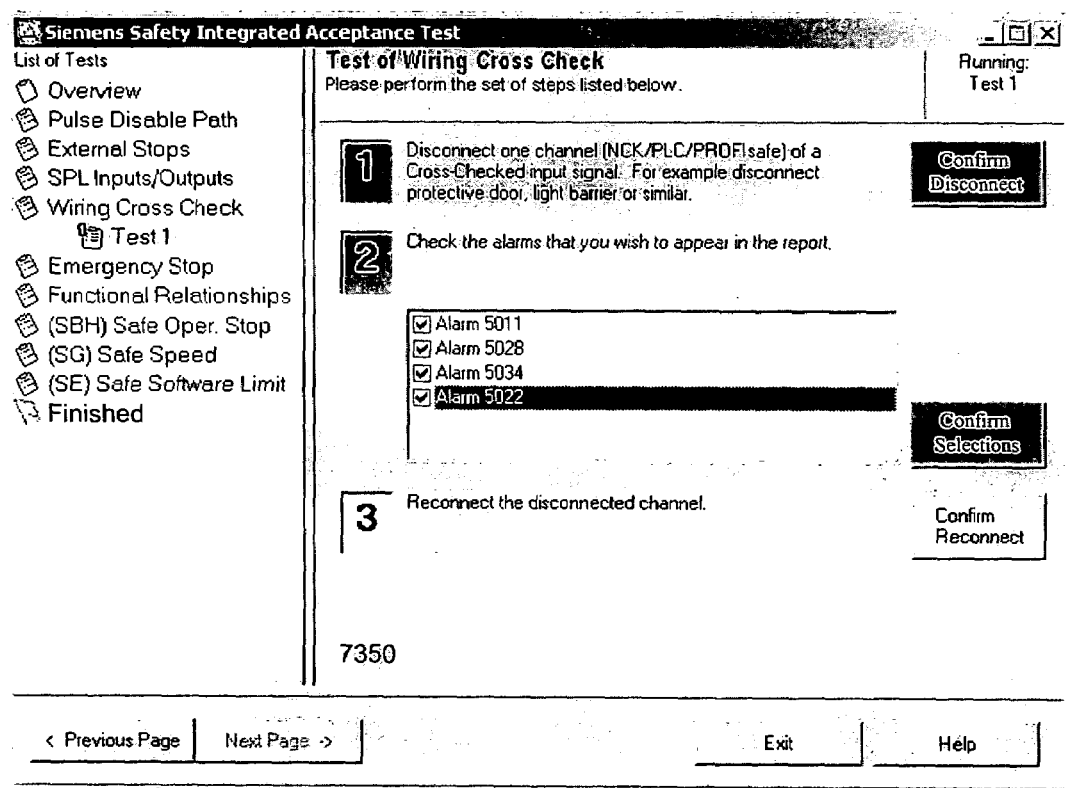
FIG. 7 is a diagram of exemplary embodiment of a user interface 7000.

FIGS. 6, 7, and 8 provide user interfaces 4000 showing, respectively, the three exemplary test screen types, namely a Test Summary Screen 4356, a Running Test Screen 4357, and a Test Results Screen 4358. Common to all of these exemplary dialog screens can be an area at the top of the dialog that contains the test title (e.g. "Wiring Cross Check Test"), the screen type (e.g. Summary, Running Test, or Results), and the active user prompt. The user prompt can contain context specific instructions for the user action.

Referring to FIG. 6, the Test Summary Screen 6350 can contain a concise set of user instructions 6360 for performing the test. The testing process can be initiated by pressing the "Begin This Test" button 6370 on this screen. Once the test is started, the dialog can change to the Running Test Screen (shown in FIG. 7).

Referring to FIG. 7, the Running Test Screen 7350 can implement the testing action. This screen can be where the user is prompted to perform the test actions in a step-by-step manner. The test steps can be indicated numerically on the left of the dialog and with text on the right. The background color of the test step indicator (the number) can be used to indicate status and as an aid to the prompting. For instance:

Yellow can be used to indicate the active step. The prompt that appears in the display area at the top of the dialog can apply to this step.

Green can be used to indicate a completed step. In certain embodiments, the user cannot progress to next step without completing the current step. Thus, the wizard enforces completion of the current step.

Gray can be used to indicate a step that has yet to become active. The user has never progressed to this step.

Running Test Screen 7350 can comprise steps that apply to any of four typical steps of running a test, namely:

Establishing initial conditions: enter some data for the test
Initiating data collection: this is usually not an explicit step, but can occur automatically when all test data has been entered
Terminate data collection: stop the data collection
Selection of persisted data: make data selections Note that because automation can be applied wherever possible, some tests do not necessarily contain all of these steps. For instance, if a test does not involve data input to establish the initial conditions, then the data collection can be started upon entry of the Running Test Screen 4357 or in response to a button press by the user. Also if the test does not involve automated data collection, but instead relies totally on observations made by the user, then steps two an three can be skipped or collapsed into a single action (step).

Referring to FIG. 8, Test Results Screen 8350 can be used to specify the pass/fail status of the test. The prompting for the pass/fail status can be presented in the form of a set of radio buttons with test specific captions. This can be a continuation of the overall user interface theme of presenting user tasks as part of an overall test specific dialog with the user.

Test Results Screen 8350 also can serve as the place where the user test results are entered. Some tests can depend on user observations for test results and this screen is where that data is entered. Often, the presentation can involve prompting that includes the captured data from the Running Test Screen (of FIG. 7). The data that is input here can be persisted and can be used as the test results portion of the Acceptance Test Certificate document.

Also provided on the Test Results Screen 8350 can be buttons for repeating (see "Repeat This Test" button) the test procedure and/or for deleting test results (see "Delete Test Results" button). In certain exemplary embodiments, these buttons can only be enabled after the pass/fail status for the test has been set.

Repeating a test refers to running the same test procedure again, potentially with different commissioning. Results from the current test are not necessarily discarded. In certain exemplary embodiments, test results can only be discarded by explicit deletion (using the "Delete Test Results" button). Repeating can be appropriate for tests that involve multiple test iterations with different commissioning, such as tests that are performed on multiple I/O points or axes.

Test deletion refers to the permanent destruction of existing test results. If a user navigates to the results of a test with the Test Selection\Status screen, that navigation can result in a rendering of the Test Results screen for that test. Once on the screen the user can edit the persisted data, change the pass/fail status, delete the test results all together, and/or run another test.

FIG. 9 illustrates an exemplary user interface 9000. This example shows a quantitative type test where the success or failure of the test is determined by numerical analysis of collected data. As one might expect, the user interface for a quantitative test might differ little from that of a qualitative test. The only difference being, for this particular example, that the Results page includes numerical or graphical information and some associated capabilities for data analysis.

A quantitative test can include numerical and/or graphical data in the results screen and/or also in the associated Acceptance Test Certificate entry. FIG. 9 comprises three graphs, which are shown as graphic thumbnail insets to pane 9350. These graphs contain the actual position, the actual speed, and the drive set speed, respectively. If the user requires a detailed view of the graphs, they can be expanded into a pop-up modal dialog by clicking the "View Results Graph" button or by double-clicking one of the graphic thumbnails.

Figure 10:
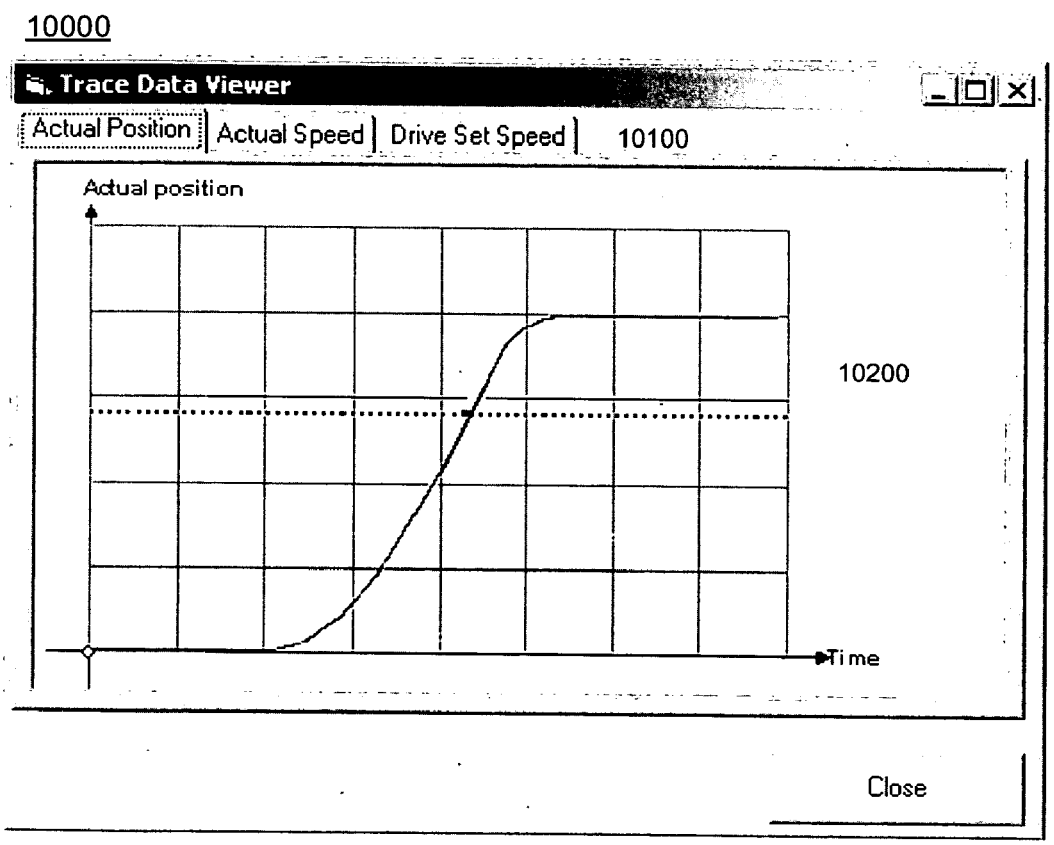
FIG. 10 is a diagram of exemplary embodiment of a user interface 10000.

FIG. 10 illustrates an exemplary Trace Data Viewer 10000. As shown, Viewer 10000 can include a time-based plot 10100 (i.e., a trace) for any of several variables 10200, such as actual position, actual speed, and/or drive set speed. Viewer 10000 can utilize a Trace ActiveX UI control to produce a graphic metafile that can be displayed in Trace Data Viewer 10000 as plot 10100 and/or which can be later incorporated into the Acceptance Test Certificate. The Trace ActiveX UI Control can capture data during the dynamic data (like speeds, velocities, etc.) or events (like alarms) during the running of a test. The period of data collection is either determined by an implicit or explicit starting and stopping of the sampling or is achieved using a trigger that is set up to capture a particular data set.

The wizard can provide automated analysis of trace data for quantitative tests. This can be done to reduce the work required of the user for the determination of the success of failure of the test. The wizard can extract pertinent numerical information from the trace data and present that information separately from the raw graphical data.

For example, a test of safe software limits can require the determination of the reaction time for determination of the pass/fail status. For this test, the wizard can provide all the pertinent graphical information as well as a display of the reaction time that was extracted from the trace data.

In certain exemplary embodiments, the user need not be aware of the data collection mechanisms being used, and the wizard can hide the configuration of the data collection from the user and/or minimize the amount of user data entry required for the data collection. For instance, when a user specifies an axis for testing, the axis information can be used internally as a data specification for the Sinumerik Trace ActiveX. The user is not necessarily prompted to setup the data collection, but instead can be prompted for information pertinent to the test procedure.

In various exemplary embodiments, the wizard can provide multi-language support, serialization of test results data, and/or an automatically created acceptance test certificate. The certificate can be produced as a Rich Text Format (RTF) file. RTF is a method for encoding text and graphics for easy transfer between applications. All modern word processing programs can edit or import files encoded in this form.

The Safety Integrated Acceptance Test Certificate file can be created by merging data from the Test Results Data file with a language-specific Certificate Template file to create a third file that becomes the Acceptance Test Certificate File.

The merge operation can involve merging data from a data source, in this case the Test Results Data File, with the Certificate Template File using RTF bookmarks that specify the positions for the merging. The association (or referencing) of test results data (the merge data) to bookmarks (the position for merge) can be encoded in an XML element that also contains the test data.

The referencing of the XML elements in the Test Results Data File to the RTF bookmarks in the Certificate Template File can occur by associating the XML element start-tag to the RTF bookmark control word.

The merge process can involve associating bookmarks found while scanning the Certificate Template File to bookmarked data (references) found in the Test Results Data File. This can allow the organization of the Certificate Template File not to be affected by the order the tests are run. Bookmarks in the Certificate Template File can be referenced by bookmarked data in the Test Results Data File result in a merge operation being performed. Any unreferenced bookmarks of the Certificate Template File can remain unmodified when copied to the Acceptance Test Certificate File. A new Acceptance Test Certificate File can be created as a result of the merge operation. If the file already exists, its contents can be overwritten.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United State patent, United State patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
   automatically enforcing user compliance with a plurality of predetermined steps of a computer-assisted verification test of a safety feature for a machine system;
   providing a user interface adapted for selecting a sequential ordering of a plurality of computer-assisted verification tests to perform, the plurality of computer-assisted verification tests comprising the verification test;
   inducing an error condition in the machine system; and
   collecting data regarding a response of the machine system to the error condition.

2. The method of claim 1, further comprising:
   providing a user interface adapted for selecting a stage of development for the machine system.

3. The method of claim 1, further comprising:
   receiving a user selection of a stage of development for the machine system.

4. The method of claim 1, further comprising:
   providing a user interface adapted for selecting the verification test from a plurality of potential computer-assisted verification tests.

5. The method of claim 1, further comprising:
   providing a user interface adapted for selecting the verification test from a plurality of potential computer-assisted verification tests, the plurality of potential computer-assisted verification tests limited by a stage of development of the machine system.

6. The method of claim 1, further comprising:
   receiving a user selection of the verification test from a plurality of potential computer-assisted verification tests.

7. The method of claim 1, further comprising:
   receiving a user selection of a sequential ordering of a plurality of computer-assisted verification tests to perform the plurality of computer-assisted verification tests comprising the verification test.

8. The method of claim 1, further comprising:
providing a user interface adapted for configuring the verification test.

9. The method of claim 1, further comprising:
receiving a user-selected configuration adapted for use in the verification test.

10. The method of claim 1, further comprising:
providing instructions adapted for use in the verification test.

11. The method of claim 1, further comprising:
providing instructional information to a user performing the verification test.

12. The method of claim 1, further comprising:
setting-up one or more initial conditions adapted for use in the verification test.

13. The method of claim 1, further comprising:
prompting a user to perform a step from the plurality of predetermined steps of the verification test.

14. The method of claim 1, further comprising:
removing the induced error condition.

15. The method of claim 1, further comprising:
resetting a data collector.

16. The method of claim 1, further comprising:
placing a numerically controlled machine tool in a test mode.

17. The method of claim 1, further comprising:
verifying that the verification test succeeded.

18. The method of claim 1, further comprising:
facilitating human verification that the verification test succeeded.

19. The method of claim 1 further comprising:
monitoring the verification test.

20. The method of claim 1, further comprising:
collecting data regarding the plurality of predetermined steps performed during the verification test.

21. The method of claim 1, further comprising:
collecting data regarding an error condition generated during the verification test.

22. The method of claim 1, further comprising:
rendering the collected data.

23. The method of claim 1, further comprising:
analyzing the collected data.

24. The method of claim 1, further comprising:
processing the collected data.

25. The method of claim 1, further comprising:
updating a status of the verification test after correction of a problem.

26. The method of claim 1, further comprising:
merging verification test information with a standardized template to create a report.

27. The method of claim 1, further comprising:
generating a report of the verification test.

28. The method of claim 1, further comprising:
generating a report of the verification test, the report comprising an identity of the verification test performed.

29. The method of claim 1, further comprising:
generating a report of the verification test, the report comprising an identity of the plurality of predetermined steps.

30. The method of claim 1, further comprising:
generating a report of the verification test, the report comprising a description of the plurality of predetermined steps.

31. The method of claim 1, further comprising:
generating a report of the verification test, the report comprising initial conditions.

32. The method of claim 1, further comprising:
generating a report of the verification test, the report comprising the error condition induced.

33. The method of claim 1, further comprising:
generating a report of the verification test, the report comprising the data collected.

34. The method of claim 1, further comprising:
generating a report of the verification test, the report comprising analysis of the collected data.

35. The method of claim 1, wherein user compliance is enforced via a graphical user interface.

36. The method of claim 1, wherein the collected data comprise status data.

37. The method of claim 1, wherein the collected data comprise alarm data.

38. The method of claim 1, wherein the collected data comprise a trace.

39. The method of claim 1, wherein the machine system comprises a machine tool.

40. The method of claim 1, wherein the machine system comprises a numerical controller.

41. A system, comprising:
a compliance processor adapted to automatically enforce user compliance with a plurality of predetermined steps of a computer-assisted verification test of a safety feature for a machine system said compliance processor adapted to provide a user interface, said user interface adapted for selecting a sequential ordering of a plurality of computer-assisted verification tests to perform, the plurality of computer-assisted verification tests comprising the verification test;
an error processor adapted to induce an error condition in the machine system;
a data processor adapted to collect data regarding a response of the machine system to the error condition.

42. A machine-readable medium containing instructions for activities comprising:
automatically enforcing user compliance with a plurality of predetermined steps of a computer-assisted verification test of a safety feature for a machine system;
providing a user interface adapted for selecting a sequential ordering of a plurality of computer-assisted verification tests to perform, the plurality of computer-assisted verification tests comprising the verification test;
inducing an error condition in the machine system;
collecting data regarding a response of the machine system to the error condition.

* * * * *